May 2, 1939.　　　　　F. L. ROCKE　　　　　2,156,770
LUBRICATION SYSTEM FOR DRIVE MECHANISM
Filed Feb. 26, 1937　　　　2 Sheets—Sheet 2
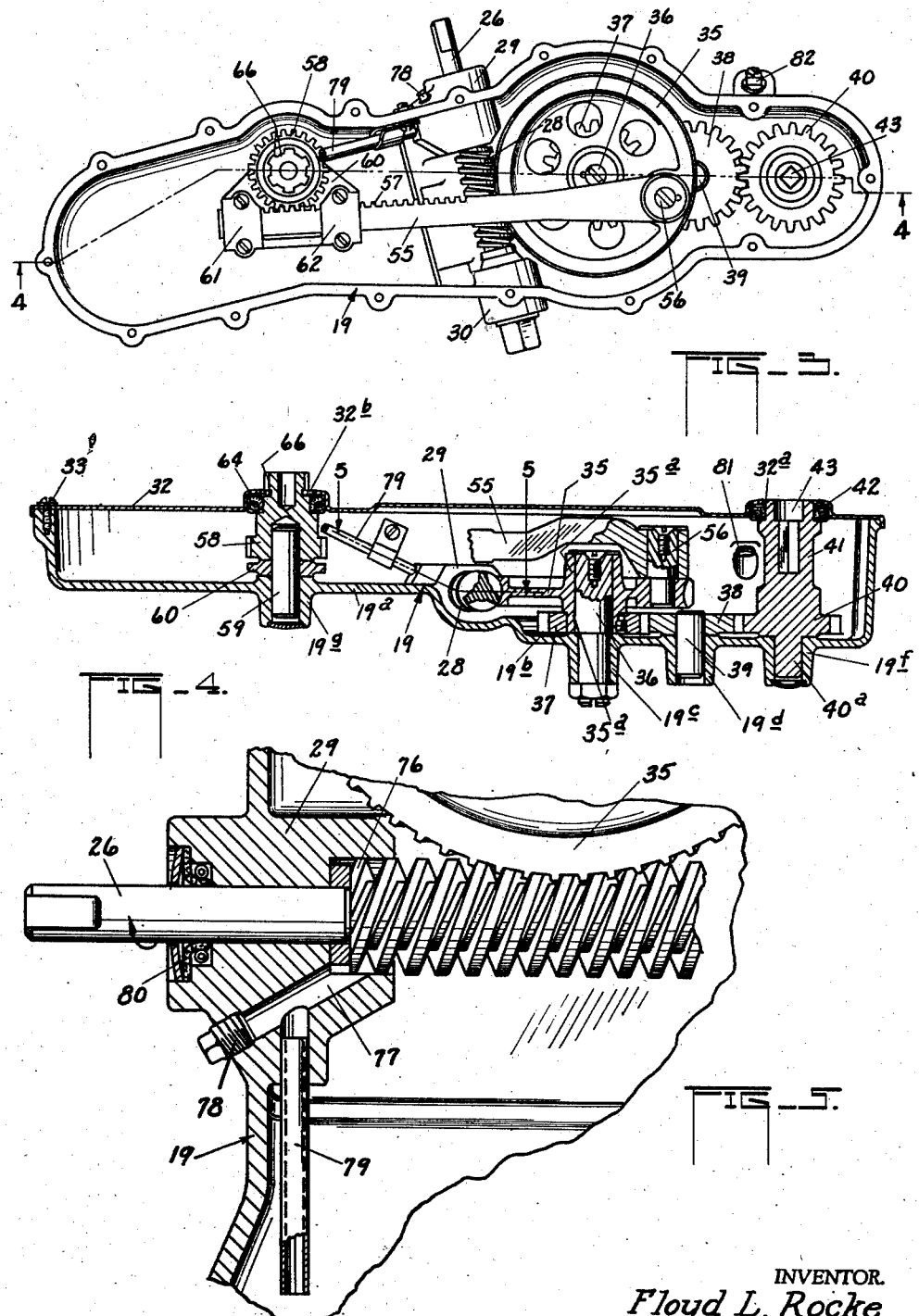
INVENTOR.
Floyd L. Rocke.
BY
ATTORNEY.

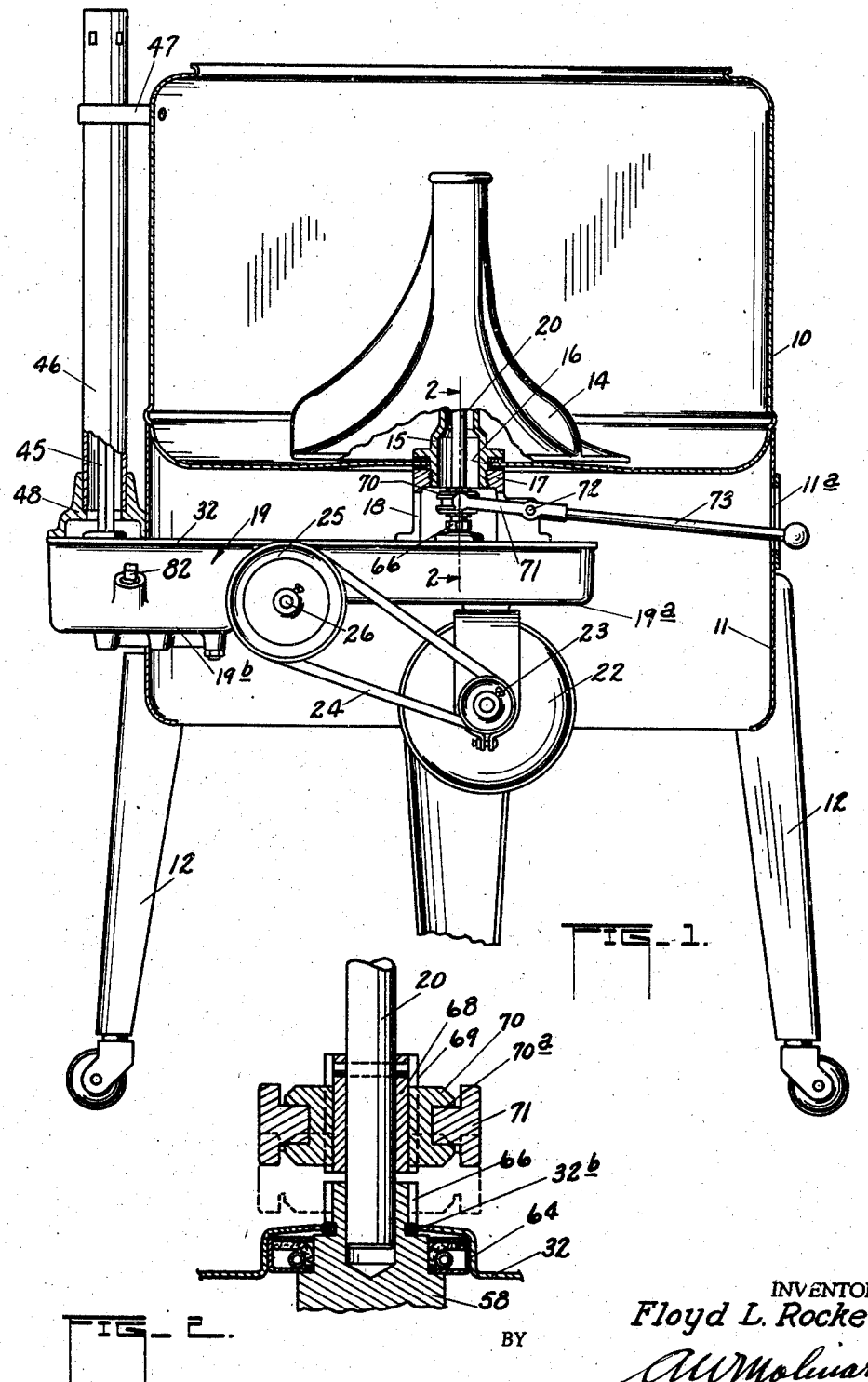

Patented May 2, 1939

2,156,770

UNITED STATES PATENT OFFICE 2,156,770

LUBRICATION SYSTEM FOR DRIVE MECHANISM

Floyd L. Rocke, Bloomington, Ill., assignor to Electric Household Utilities Corporation, Chicago, Ill., a corporation of Illinois Application February 26, 1937, Serial No. 127,829

2 Claims. (Cl. 184—6)

The present invention relates to driving mechanisms for transmitting motion from a source of energy, and more especially to the provision of means for lubricating certain parts of the drive mechanism.

For certain types of apparatus or machines, and particularly that class used in the household, it has been the trend of manufacturers to initially provide for the lubrication of certain vital elements of the mechanism so as not to require attention in this respect for substantial periods of time. In general, the driving mechanism for devices and machines of the character indicated are enclosed within a housing which is at least partially filled with suitable lubricant, directly contacting certain of the vital elements of the drive mechanism, and to insure against accidental loss of the lubricating due to handling of the mechanism or device, such housings are preferably sealed. It can be readily appreciated that the provision of means for insuring lubrication of the driving mechanism for a long period of time may result in many disadvantages, such as, the initial requirement of an excessive amount of lubricant; the great danger of injuring the motive power, such as the electric motor, in the event that the device of machine is exposed to low temperature which results in chilling and solidifying of the lubricant to such an extent that it imposes an excessive load upon the motor which sometimes results in rendering the drive mechanism inoperative until the lubricant is reduced to a more liquid consistency.

One of the objects of the present invention resides in the provision of novel means for insuring full and proper lubrication of certain vital elements of a driving mechanism while at the same time necessitating using only a small quantity of lubricant, as compared to that heretofore employed in similar devices and mechanisms.

Another object resides in the provision of novel means for forcibly feeding lubricant to certain predetermined parts of the driving mechanism.

Other objects and advantages of this invention will be apparent from the following description taken in connection with the accompanying drawings, in which,—

Fig. 1 is a view in side elevation of a washing machine, part in section, having a driving mechanism provided with the novel means embodying the present invention for insuring lubrication.

Fig. 2 is a vertical section through a portion of the driving mechanism of the washing machine, taken as indicated at line 2—2 on Fig. 1.

Fig. 3 is a horizontal section through the driving mechanism, with cover removed, and shown looking from the opposite side of the machine seen in Fig. 1.

Fig. 4 is a vertical section through the driving mechanism, taken as indicated at line 4—4 on Fig. 3, and, Fig. 5 is an enlarged fragmentary sectional view taken at line 5—5 on Fig. 4, showing in detail a specific construction and arrangement for forcibly feeding lubricant to certain parts of the drive mechanism.

For purpose of illustration the present invention is herein disclosed in connection with a driving mechanism of a washing machine which as shown in Fig. 1 comprises an upwardly open tub 10 having a depending skirt 11, to which is connected a plurality of legs 12 for supporting the tub in proper spaced relation to the floor. Mounted within the tub adjacent the bottom and centrally thereof is a conventional form of oscillating agitator or impeller member 14 which causes turbulence of the water and clothes for performing a cleansing operation upon the latter. This agitator is mounted on the upper end of a vertically disposed tubular standard 15, the lower end of which projects downwardly through an opening 16 in the bottom of the tub and the extreme lower portion thereof is threaded for engagement with a bracket 17, which in turn is secured to a housing 19 containing the driving mechanism for said agitator and a wringer (not shown). Extending upwardly through the tubular standard 15 is a vertically disposed drive shaft 20, the upper end of which may be understood to be connected to the agitator 14 in any conventional manner for imparting rotary motion thereto.

Mounted below the housing 19 is an electric motor 22 having a pulley 23 which through the medium of a belt 24 drives a pulley 25 rigidly mounted on a shaft 26 which is a stub end extension of a worm 28, the opposite end of which is provided with a similar stub shaft. Said worm extends in a substantially horizontal direction with its stub ends journaled in bearings 29 and 30 respectively, formed as an integral part of the housing 19.

As may be seen in the drawings, said housing is of generally elongated shape, for containing the driving mechanism which is enclosed therein by a cover plate 32 secured to the marginal edges of said housing by screws 33. The bottom of the housing is formed in two main portions 19ª and 19ᵇ, the latter being disposed at a lower horizontal plane than the portion 19ª, and form a reservoir for a body of lubricant, the upper surface of which desirably, is approximately level with the bottom of portion 19a of the housing.

As may be seen in the drawings, said worm 28 is located so that a substantial portion thereof extends into the lubricant in the bottom portion 19b. Meshed with said worm is a worm gear 35 mounted on a vertical shaft 36, the lower end of which is reduced to form a shoulder to provide bearing support on the upper surface of the lower bottom portion 19b with the reduced portion journaled in a bearing 19c of the housing. The drive for the wringer includes a pinion 37 rigidly mounted on the lower hub 35a of the worm gear 35, said pinion meshing with a gear 38 mounted on a vertical shaft 39 journaled in a bearing 19d of the bottom portion 19b of the housing, and meshed with said gear 38 is a pinion 40, the under surface of which is formed with a depending stub shaft 40a journaled in a bearing 19f of the lower portion 19b of the housing. Formed integrally with said pinion 40 is an up-standing hub 41, the upper end of which is shouldered to accommodate an oil seal 42 which abuts against the under side of the cover element 32. The upper reduced end of said hub 41 extends through an opening 32a of the cover 32 and is formed with an upwardly open socket 43 for receiving the lower end of a vertically disposed shaft 45 which is located outside of the tub body 10 and extends above the upper end thereof for connection by a suitable means (not shown) for driving a wringer in a conventional manner. Said shaft 45 is enclosed within a tubular standard 46 connected at its upper end by a bracket 47 to the outside of the tub body while its lower end is seated in a bracket 48 connected to the top of the housing 19, as seen in Fig. 1.

The mechanism for rotating the agitator 14 includes a horizontally reciprocating rack bar 55 which extends above the worm 28 and gear 35, and is pivotally connected at one end by a pin 56 to the worm gear 35 while its opposite end is formed with a plurality of teeth 57 meshed with a pinion 58, mounted on a pin 59 journaled in a bearing 19g formed in the upper bottom portion 19a of the housing 19. Mounted beneath the pinion 58 on said pin 59 is a yoke member 60 having a pair of spaced-apart bearings 61 and 62 through which the rack bar 55 is slidably guided in proper relation to the pinion 58. The upper portion of said pinion 58 is formed with a shouldered hub on which is seated an oil seal 64, the upper surface of which engages the under side of the cover element 32. The extreme upper end of said hub projects upwardly through an opening 32b in said cover, and is formed with external splines 66 to constitute a clutch element for driving the agitator 14. Rigidly mounted on the lower end of the agitator shaft 20 is a sleeve 68, the external surface of which is splined as indicated at 69 on which a cooperative clutch member 70 is mounted for axial movement in vertical direction, and is adapted to register with and engage the splines 66 of the hub of said pinion 58 for imparting oscillatory motion to said agitator shaft 20 and agitator 14. As may be seen from the drawings, during one-half revolution of the worm gear 35, the rack bar 55 is moved longitudinally in one direction, thus imparting through pinion 58 and the clutch elements, rotation to the agitator 14, and during the second half revolution of the gear 35, the rack bar 55, is moved in the opposite direction, thus reversing the rotation of the agitator 14. This alternate reversing of the rotation of the agitator is continuous while the clutch is engaged. To disengage the drive to the agitator, I provide a yoke 71 engaging the movable splined element 70, and pivoted at 72. Connected to said yoke is a horizontally extending control rod 73, the free end of which extends through an opening 11a of the skirt 11 for convenient manual manipulation. Thus when the rod is moved up the clutch elements 66 and 70 are engaged, and become disengaged when the rod is moved downward.

By virtue of the present invention it is possible to raise the level of the bottom portion 19a of said housing 19, with respect to the bottom portion 19b, as above described, so as to render the construction more compact, and which will also effect a saving in material and weight. Furthermore, it is only essential that the housing 19 be filled with lubricant approximately to a level corresponding with the bottom of the upper portion 19a of the housing. To insure against excessive wear and tear on the rack bar 55 and pinion 58 and to reduce noises I have provided means for forcibly and continuously supplying quantities of lubricant to these parts while the drive mechanism is in operation. For this purpose the bearing 29 of the housing 19 which supports the stub shaft 26 of the worm is formed with a chamber 76 into which the adjacent end of the worm projects, as seen in Fig. 5. Communicating with said chamber is a duct 77 which, as shown in Fig. 5, is a hole bored through from the exterior of the bearing 29 at an oblique angle and opening into the chamber 76; the outer end of said bore being closed by a screw plug 78. It is to be understood, of course, that this duct as well as the chamber 76 may be formed in any other desirable manner as by coring during the casting of the housing 19. Communicating with the duct 77 is a tubular conduit 79 which extends in a generally upwardly inclined direction and having its opposite end terminating above the teeth of the pinion 58 so that as the lubricant is discharged onto the pinion it lubricates the bearing 19g and flows down over the teeth and completely lubricates them and the cooperative teeth 57 of the rack bar 55. It will be apparent that when the worm 28 rotates in the direction indicated by the arrow as shown in Fig. 5, lubricant is continuously fed into the chamber 76 and is forced in an upwardly direction through the duct 77 and tube 79 for discharge at the upper end of said tube on the teeth of the pinion 58. The outer end of the bearing 29 surrounding the stub shaft 26 is provided with an oil seal 80 to prevent the oil from seeping along the shaft 26.

The vertical wall of the housing 19, preferably in registration with the portion 19b, is provided with a downwardly inclined inlet opening 81, for supplying lubricant to the interior of the housing after said housing with the drive mechanism therein is completely assembled. The upper end of said opening is normally closed by a pipe plug 82.

It will be apparent that the chamber into which the oil is fed by the worm 28 may be of any suitable size or shape and any number of ducts 77 and/or tubes 79 may be provided for forcibly supplying a quantity of lubricant to various elements of the drive mechanism, or the passageways 77 and 79 may be cored in the housing, if desired. It is to be understood that the terms "duct" and "tube" as used in the claims is intended to define any suitable form of passageway through which the lubricant may be forcibly fed to a desired part of the mechanism, and I do not intend that the claims be restricted to the specific form of passageway shown and described.

Although I have shown and described a preferred embodiment of my invention, manifestly it is capable of modification and rearrangement without departing from the spirit and scope thereof. I do not, therefore, wish to be understood as limiting this invention to the precise form herein disclosed, except as it may be so limited in the appended claims.

I claim:

1. The combination of a housing having a bottom formed with two portions disposed at different horizontal levels, the lower portion serving as a reservoir for a body of lubricant, driving mechanism mounted in said housing, including a worm and worm gear speed reducer, said worm being provided with stub shafts at opposite ends journaled in said housing, the inner wall of said housing adjacent one of said shafts being formed to provide a chamber surrounding the stub shaft and into which one end of said worm projects, means for rotating the worm for feeding the lubricant into the chamber, and a conduit connected at one end into said chamber while its opposite end extends above the level of the lubricant in said reservoir and is disposed adjacent another part of said driving mechanism for supplying lubricant thereto.

2. The combination of a housing having a bottom formed with two portions disposed at different horizontal levels, the lower portion serving as a reservoir for a body of lubricant, driving mechanism mounted in said lower portion of the housing, including a worm and worm gear speed reducer, said worm being provided with stub shafts at opposite ends journaled in bearings formed integrally with the walls of said housing, the inner end of one of said bearings being formed to provide a chamber surrounding the stub shaft and into which one end of said worm projects, means for rotating the worm for feeding the lubricant into the chamber, and a conduit connected at one end into said chamber while its opposite end extends above the level of the lubricant in said reservoir and is disposed adjacent another part of said driving mechanism mounted on the said upper portion of the housing for supplying lubricant thereto.

FLOYD L. ROCKE.